United States Patent [19]

Bok et al.

[11] 4,126,409

[45] Nov. 21, 1978

[54] FLASH ARRAY PROVIDED WITH A HIGH VOLTAGE COMBUSTION FLASH LAMP

[75] Inventors: Johannes G. Bok, Eindhoven; Bauke J. Roelevink, Terneuzen; Jan van Werkhoven, Eindhoven, all of Netherlands

[73] Assignee: U.S. Philips Corporation, New York, N.Y.

[21] Appl. No.: 701,223

[22] Filed: Jun. 30, 1976

[30] Foreign Application Priority Data

Jul. 2, 1975 [NL] Netherlands .......................... 7507857

[51] Int. Cl.² .............................................. F21K 5/02
[52] U.S. Cl. ...................................... 431/359; 362/15
[58] Field of Search .................... 431/93, 94, 95, 95 A; 240/1.3; 354/148, 143; 52/512, 514, 506; 362/13, 15

[56] References Cited

U.S. PATENT DOCUMENTS

| | | |
|---|---|---|
| 3,523,931 | 10/1970 | Cote et al. ................................ 431/95 |
| 3,668,468 | 6/1972 | Kornrumf et al. ...................... 431/95 |
| 3,951,582 | 4/1976 | Holub et al. ......................... 431/95 R |
| 3,988,647 | 10/1976 | Bolon et al. ........................... 240/1.3 |

Primary Examiner—Carroll B. Dority, Jr.
Attorney, Agent, or Firm—Frank R. Trifari; Robert S. Smith

[57] ABSTRACT

The invention relates to a flash array provided with a number of high voltage combustion flash lamps which each cooperate with a single reflector sheet of an electrically conducting material. This reflector sheet is provided with holes; when a lamp is flashed a radiation-sensitive switching contact is affected via one of the holes.

According to the invention the radiation-sensitive contacts open responsive to radiation. These contacts and the reflectors are connected to one another via a low-ohmic connection and whereby further a lamp, whose turn has not yet come, is short circuited. These measures result in the fact that the chance for premature ignition of a lamp is extremely small.

3 Claims, 4 Drawing Figures

FLASH ARRAY PROVIDED WITH A HIGH VOLTAGE COMBUSTION FLASH LAMP

The invention relates to a flash array provided with at least one high voltage combustion flash lamp which has two electrical terminals, the lamp being positioned in a reflector which is provided with at least a layer of an electrically conducting material. The reflector layer reflector is provided with a hole. Disposed in alignment with the connecting path from the lamp to the hole there is a radiation-sensitive switching contact for the through-connection to a next flash lamp of the flash array. The switching contact responds to the radiation emitted by the first-mentioned lamp on flashing. The reflector is connected to one of the terminals of the first lamp through a low ohmic connection.

In a known flash array of the kind designated in the preamble the radiation-sensitive switching contact is designed as make contact. By the term make contact is to be understood an electrical circuit contact which, when activated, renders a path conductive which was originally electrically non-conducting.

A disadvantage of that known flash array is that when a high voltage pulse is applied to a preceding lamp, to have that preceding lamp ignite, the large difference in potential is realized at the same time between on the one hand the reflector and, that terminal of the lamp whose turn has not yet become connected to the reflector, and on the other hand a part of the make contact there disposed. This large difference in potential might result in the premature ignition of the lamp whose turn has not yet come. A further disadvantage of the known flash array is that, with a flash lamp whose turn has not yet come, a terminal of that lamp which is connected to the make contact, shows a floating potential. Also this circumstance may result in a premature ignition of that lamp by the pulses induced in that connection.

It is an object of the invention to avoid, as much as possible, the premature ignition of flash lamps in a flash array of the kind mentioned in the preamble.

A flash array according to the invention, provided with at least one high voltage combustion flash lamp which has two electrical terminals. The lamp is disposed in a reflector which comprises at least a layer of an electrically conducting material. The reflector layer is provided with a hole disposed in alignment with the connecting path from the lamp to the hole is a radiation-sensitive switching contact. The radiation sensitive switching contact is disposed in the through-connection to a next flash lamp of the flash array. The switching contact responds to the radiation emitted by the first lamp on flashing, the reflector being connected to one of the terminals of said first lamp through a low-ohmic connection. The radiation-sensitive contact is a break contact. This break contact and the reflector are connected to the same terminal of the first lamp.

An advantage of this flash array according to the invention is that the radiation-sensitive switching contact behind the hole in the reflector now has, prior to flashing of that lamp, the same potential as the reflector. Actually the metal of the switching contact now constitutes, together with the electrically conducting part of the reflector, a part of a Faraday shield. This part of that shield protects the lamp inter alia from stray fields which might cause the lamp to ignite prematurely. Furthermore, the fact that the radiation-sensitive switching contact is designed as a break contact means that the connection of this break contact to the relevant terminal of the first lamp need not of necessity have a floating potential. In the prior art device with the make contact this was necessary.

It should be noted that by the term break contact is meant an electrical switch contact which, when activated, renders an originally electrically conducting path non-conducting. Prior to flashing of the lamp the break contact is conducting.

In one form of the invention the lamps of the flash array are, for example, connected in parallel, with the lamps of the parallel branches being flashed sequentially. In another form of the invention the lamps are connected in series. By way of a further protection against the undesired, premature flashing of a lamp the circuit may, for example, have been provided with a few multiple contact switches by means of which the lamps, whose turn has not yet come, are first fully disconnected.

In a preferred embodiment of a flash array according to the invention, a branch which comprises the high voltage combustion flash lamp, is short-circuited in the fully unused state of the flash array.

An advantage of this preferred embodiment is that the further protection against the premature flashing of the flash lamp is extremely simple. The short-circuit is not removed before the circuit of the lamp in question is made ready for flashing. The short-circuit may, for example, be first realized by means of a single pole switch which is included in the circuit for that purpose only, which switch is opened if the lamp must be flashed.

In a further improvement of the last-mentioned preferred embodiment of the flash array according to the invention, in which the flash array comprises at least a third flash lamp which is flashed prior to the high voltage combustion flash lamp arranged in the reflector, the short-circuit of the branch comprising the high voltage combustion flash lamp is realized by a second radiation-sensitive break contact. This second break contact acts in response to the radiation emitted by the third lamp on flashing.

An advantage of this further improvement is that a separate switch, which must be operated separately to remove the short-circuit of the next lamp can now be dispensed with.

The invention will be further explained with reference to a drawing in which.

Figure 1:
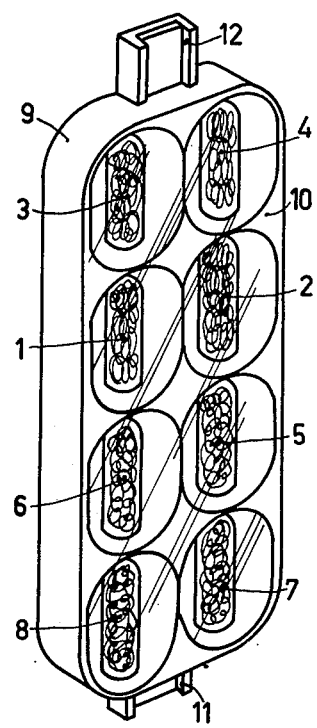
FIG. 1 is a perspective representation of a flash array according to the invention. This perspective representation shows mainly the lamp side of the flash array.

In FIG. 1 the reference numerals 1 to 8 inclusive designate high voltage combustion flash lamps. A opaque synthetic casing 9 cooperates with a transparent cover 10 positioned over the lamps. The dimensions of this flash array are approximately 11 × 4 × 1.5 cm.

In FIG. 1 reference numerals 11 and 12 designate substantially identical connecting parts of the flash array. The part 11 may be placed first in cooperating connection of a photo camera whereafter the lamps 1, 2, 3 and 4 are flashed. Thereafter the device is removed so that the opening 12 can be inserted in the said opening of the camera and the lamps 5 to 8 inclusive are flashed. This results in that the angle between the camera lens axis and that of the lamp light beam is not too close to 0°. The object is to avoid the so-called red eye effect.

Figure 2:
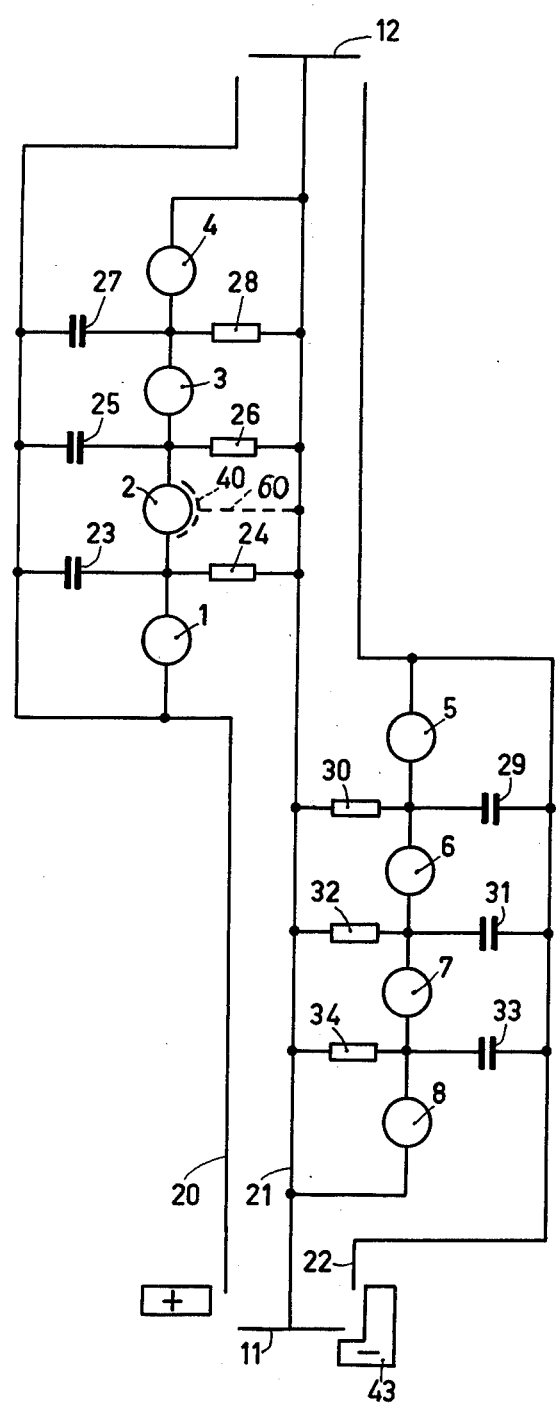
FIG. 2 shows the electrical circuit of a printed conductor board which is situated in the flash array of FIG. 1, together with the connection to the lamps and to a photo camera.

In FIG. 2 which represents the electrical circuit of a printed conductor board, associated with the flash array of FIG. 1, references 11 and 12 are again the connecting parts of the array shown in FIG. 1. The reference numerals 1 to 8 inclusive indicate those lamps of the devide which are designated in FIG. 1 by corresponding numerals. Connecting part 11 comprises three conductors, designated by 20, 21 and 22. The associated opening of the photo camera is equipped in such a way that, in the situation shown here, the conductors 21 and 22 are interconnected in the camera by camera part 43. Consequently, these conductors get the same potential, namely that of the frame of the flash array. The conductor 20 is then supplied with a pulse through the camera contact. This is effected, for example, by means of a piezo element, which is not shown here, arranged in the camera. The flash lamp 1 is connected to the conductor 20. This lamp and also all other lamps are high voltage combustion flash lamps. A capacitor 23 is also connected to the conductor 20. The other electrode of this capacitor is connected to the other end of the lamp 1. This junction is connected to a radiation-sensitive switching contact 24 which is designed as break contact. The other side of this contact 24 is connected to the conductor 21. The combustion flash lamp 2 is also connected to the junction of the capacitor 23 and the lamp 1. In a similar manner a series arrangement of the capacitor 25, a melting strip 26 and also a series arrangement of a capacitor 27 and a melting strip 28 is included between the conductors 20 and 21. If a voltage pulse is applied for the first time between the conductors 20 and 21, the lamp 1 is flashed. On flashing of that lamp 1 the melting contact 24, which originally was conducting, is melted. This removes a short-circuit from the circuit of lamp 2. If now a voltage pulse is applied for the second time between the conductors 20 and 21, the lamp 2 is flashed etc. All this is connected in a similar manner as indicated for example in FIG. 3 of Applicant's Dutch Patent Application No. 7506653.

If finally the lamp 4 is flashed, the device is reversed, as indicated already in the description of FIG. 1, so that part 12 is inserted into the suitable opening of the camera. Then the original short-circuit of the part 5, 6, 7, 8 is removed and, at the next pulse, lamp 5 is ignited first etc. The electrical circuit elements between the conductor 22 and 21 are, in this sequence: capacitor 29 and melting strip 30, capactior 31 and melting strip 32, capacitor 33 and melting strip 34.

Figure 3:
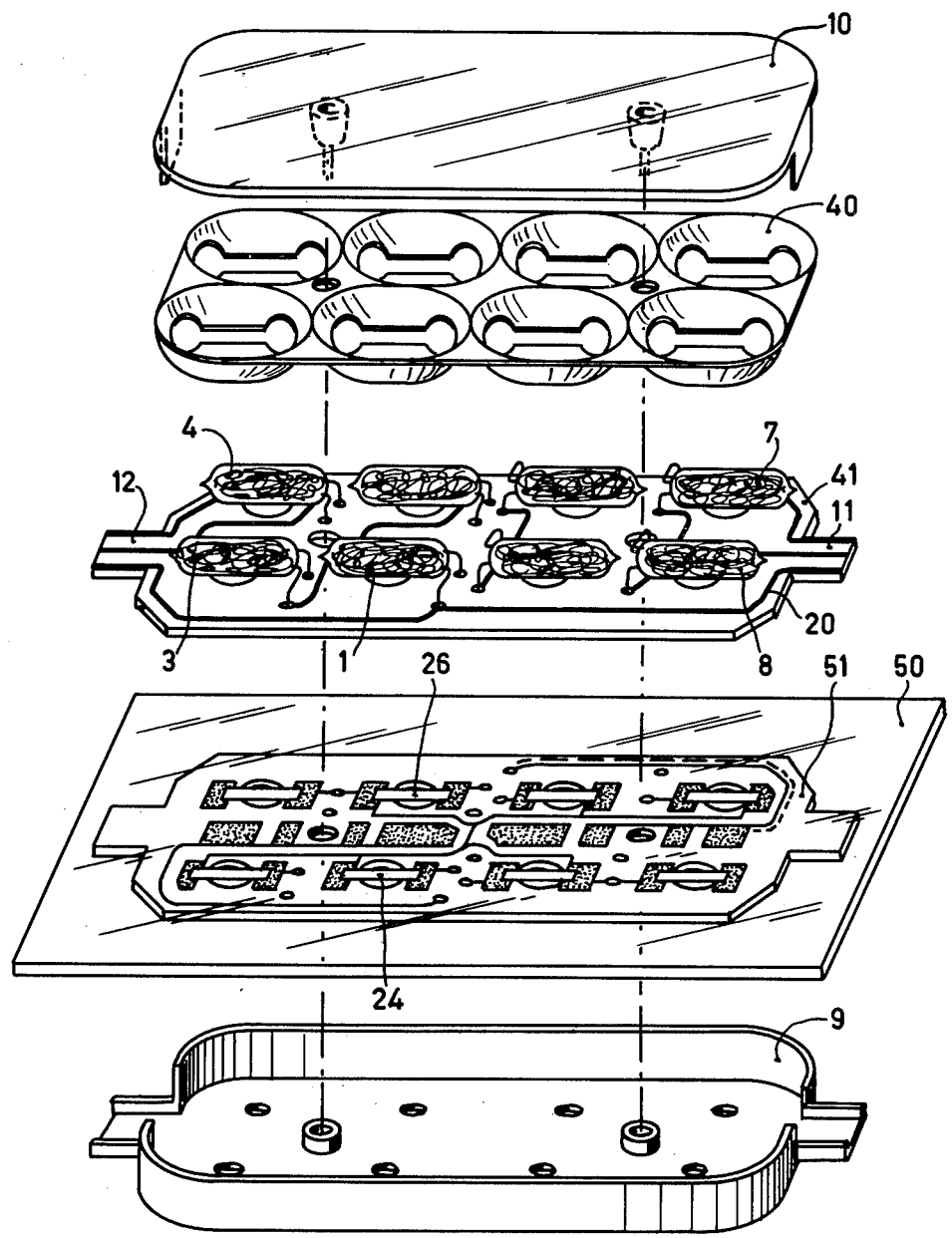
FIG. 3 shows an exploded view of the flash array of FIG. 1, which also includes a mirror to show the bottom side of the printed conductor board of the flash array.

FIG. 3 shows an exploded view of the flash array of FIG. 1 including the transparent cover 10 a metal foil 40, which in its entirety constitutes eight discrete reflectors for the lamps. The reflector side 41 carries the lamps. A mirror 50 (which does not belong to the flash array) shows the bottom side 51 of the printed conductor board. The opaque synthetic casing 9 has eight holes through which it can be verified whether the individual lamps have or have not flashed.

Figure 4:
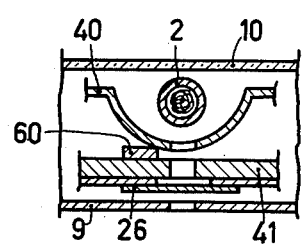
FIG. 4 shows a cross-section through a part of the flash array of FIG. 1.

FIG. 4 shows a cross-section through a part of the flash array of FIG. 1. FIG. 1 shows the transparent cover 10, the metal foil reflector 40, and the printed conductor board 41. The reflector foil 40 is supported by a copper conductor 60 disposed on the side of the board 41. The conductor 60 is connected to the conductor 21 shown in FIG. 2. As also shown diagrammatically in FIG. 2, the reflector 40 of, for example, the lamp 2 is connected to the conductor 21. The conductors 60 and 21 provide a low ohmic connection between the reflector and the radiation sensitive contacts. Since the same reflector foil cooperates with all other lamps in the assembly the reflector for every other lamp is also connected to conductor 21. FIG. 2 shows that if no lamp has been flashed, the electrical terminals of the lamp 2 are short-circuited through the strips 24 and 26. It furthermore appears that the melting strip 26 and the reflector 40 are at the same potential, so that as best seen in FIG. 4 a kind of screen, in the form of a part of a Faraday's shield is disposed about the lamp 2.

In the flash array described, owing to the measures indicated as regards shielding of the lamp premature flashing of a lamp hardly occurs.

What is claimed is:

1. An assembly which comprises: a housing, a plurality of high voltage flash lamps carried on said housing, first and second electrical terminals on each flashlamp, a reflector having a plurality of concave surfaces, each said concave surface being disposed generally about one of said lamps, said reflector comprising at least a layer of an electrically conducting material, said reflector layer including a plurality of holes, said assembly further including a plurality of connecting electrical paths, each path connecting one terminal of one of said lamps to an associated source of electrical energy, said paths connecting said lamps for operation in a predetermined sequence, each of at least some of said electrical paths including a radiation-sensitive switching contact, each of said holes being disposed in alignment with one of said radiation-sensitive switching contacts disposed in said connecting electrical paths, at least some of said holes also being aligned with one of said lamps and the particular radiation-sensitive contact connected to the next lamp in said predetermined sequence, each switching contact cooperating with radiation transmitted by flashing of the antecedent lamp in said predetermined sequence, said reflector being connected to one of said electrical connectors through a low ohmic connection, each radiation-sensitive switching contact being a break contact and each break contact and said reflector being connected to said first terminal of the first lamp to be flashed in said predetermined sequence.

2. A flash array as claimed in claim 1, wherein at least some of said high voltage combustion flash lamps are short-circuited until operation the lamp immediately preceding said lamp in said predetermined sequence.

3. A flash-array as claimed in claim 2, wherein said short circuit of each of at least some of said flash lamps is accomplished by a circuit including two of said radiation-sensitive switching contacts.

* * * * *